| United States Patent [19] | [11] 3,986,893 |
| Stephenson | [45] Oct. 19, 1976 |

[54] METHOD FOR MAKING NICKEL AND CADMIUM ELECTRODES FOR BATTERIES

[75] Inventor: Robert Frank Stephenson, Fort Lauderdale, Fla.

[73] Assignee: Motorola, Inc., Schaumburg, Ill.

[22] Filed: Nov. 28, 1975

[21] Appl. No.: 636,236

[52] U.S. Cl. .............................. 429/222; 429/223; 204/2.1
[51] Int. Cl.² ..................................... H01M 4/22
[58] Field of Search ......................... 136/76, 29, 24

[56] References Cited
UNITED STATES PATENTS

| 708,695 | 9/1902 | Christian .............................. 136/76 |
| 3,041,388 | 6/1962 | Fukuda et al. ........................ 136/29 |

Primary Examiner—John H. Mack
Assistant Examiner—C. F. Lefevour
Attorney, Agent, or Firm—Donald B. Southard; James W. Gillman

[57] ABSTRACT

An improved process for the electrolytic deposition of active material which may be in the form of a suitable metal hydroxide in a porous sintered nickel plaque, which in turn may be utilized to form the positive and/or negative electrodes of a nickel-cadmium battery. The process is characterized by the use of an organic acid such as formic acid as the buffering or support agent which effectively stabilizes the pH of the impregnating solution at an optimized value while at the same time avoids generating any particulate by-product which would otherwise contaminate the solution, thereby providing a virtually unlimited service life. Other advantages to the use of formic acid as the buffering material are disclosed as well.

7 Claims, No Drawings

3,986,893

METHOD FOR MAKING NICKEL AND CADMIUM ELECTRODES FOR BATTERIES

BACKGROUND OF THE INVENTION

The present invention relates in general to nickel-cadmium batteries and more particularly to an improved method for making nickel electrodes for use in such batteries wherein porous plaques are impregnated with active material in a very short time by a cathodization process and wherein the impregnating electrolytic solution is not contaminated and does not generate solid particulate by-products.

The most expeditious method of fabricating battery electrodes for nickel-cadmium batteries is to use a porous nickel sponge-like material and then impregnate them with a suitable active material. For the positive (nickel) electrode, the active material may be nickel hydroxide, $Ni(OH)_2$, and for the negative (cadmium) electrode, cadmium hydroxide, $Cd(OH)_2$, is customarily employed. Both such materials are solids and cannot be introduced into the minute pores of the porous plaques directly as they readily decompose before melting, when heated, and they are not soluable in the sense that they cannot be dissolved and then recovered by evaporating the solvent. Accordingly, the active materials must be deposited indirectly in some way. Usually, this means by some impregnation process.

One of the early and more commercially successful impregnation processes requires the introduction of the active material in the plaque pores by precipitating the appropriate hydroxide from a concentrated solution of the metal nitrate under vacuum. After a suitable soaking period, the vacuum can then be broken and the excess solution drained off. The plaques can then be transferred to electrolytic cells containing a solution of an alkali metal hydroxide at some elevated temperature, say, in the range of 70° to 100° C. This precipitates the corresponding hydroxide in the pores. Further, the plaques are usually made cathodic for a given period of time between nickel sheet anodes to ensure that all of the nitrate present is converted to hydroxide. The plaques may then be washed free of caustic and any loosely adherent deposits of active material brushed free or cleared off with jets of deionized water. A disadvantage of this method, however, is that the process must be repeated over and over again until the desired loading is achieved, normally up to 4–5 cycles or more.

One way of improving on the foregoing process is to employ cathodic precipitation. The actual impregnation of the nickel plaque sheets can be effected in minutes as compared to hours or even days in the more conventional method above described. The cathodic process involves a pH change at the surface of the sintered plaque serving as a cathode which is sufficient to precipitate the metal hydroxide from the electrolyte solution used, conventionally a metal nitrate solution, such as nickel or cadmium nitrate. Solution temperature, concentration and current density are all variables which must be carefully controlled if optimum results are to be obtained.

Additionally, and of particular importance, is the pH. Since the metal anion of the impregnating solution is reduced electrochemically, a zone of high pH is created at the plaque-solution interface. If counterfactors are not introduced, the bulk pH of the electrolytic solution undergoes rather abrupt and substantial changes. The result is a substantial slowing of the precipitation of the metal hydroxide serving as the active material in the plaque structure.

A particular solution to this problem is the inclusion of a buffering or support agent in the electrolytic solution. One known process utilizes an alkali nitrite, such as sodium or potassium nitrite, in sufficient amount to prevent oxygen evolution at the anode and thereby stabilizing the bulk pH of the solution. It nevertheless gives rise to a solid by-product, namely, sodium or potassium nitrate, which continues to build up in the impregnation solution to a point where the solution must either be purified or else discarded.

SUMMARY OF THE INVENTION

Accordingly, it is a general object of the present invention to provide an improved method of making nickel electrodes for alkaline batteries or the like in a cathodization impregnation process which overcomes the foregoing deficiencies.

A more particular object of the present invention is to provide an improved method of making such metal electrodes in which sintered porous plaques are impregnated with suitable active material in a cathodization process and wherein the pH of the impregnating solutions effectively stabilized but is not contaminated by solid particulate by-products.

Another object of the present invention is to provide an improved method of manufacturing nickel electrodes by a cathodization process of the foregoing type wherein the impregnating solutions employed do not require periodic purification or regeneration thereby ensuring substantially unlimited solution service life.

In one aspect of the invention., a hot electrochemical method of impregnating sintered, porous nickel plaques is provided which generally involves cathodizing the nickel plaque in a hot or boiling solution of nickel nitrate as the impregnating solution. The reaction is optimized at a bulk solution pH of about four. This provides for the required reduction of the metal nitrate, either nickel nitrate, $Ni(NO_3)_2$, cobalt nitrate, $Co(NO_3)_2$, or cadmium nitrate, $Cd(NO_3)_2$, to the corresponding hydroxide, $Ni(OH)_2$, $Co(NO_3)_2$, or $Cd(OH)_2$, impregnating the porous plaque material.

In addition, a supporting or buffering electrolyte is included to stabilize the pH during impregnation to substantially its optimum factor. The present invention, however, contemplates the use of an organic acid, namely formic acid or any homolog of formic acid, rather than an alkali metal nitrite as disclosed in various of the prior art references. An advantage of using formic acid is that it has a pKa of 3.75 and capable of buffering the impregnating solution at an optimized ph of about four (4). Further, formic acid is easily oxidized to carbon dioxide and thereby rapidly expelled from the acetic solution. No by-products are formed as in the previous prior art processes which eventually require the impregnating solutions to either be purified or discarded after a given time.

DETAILED DESCRIPTION OF THE INVENTION

As mentioned previously, the present invention contemplates an improved method of impregnating porous nickel plaques with an appropriate active metal whereby the overall structure may serve as the respective electrodes of the contemplated nickel-cadmium battery. The positive electrode conventionally includes nickel hydroxide, $Ni(OH)_2$ as the active material while the negative electrode usually employs cadmium hydroxide, $Cd(OH)_2$.

These types of electrodes greatly improve the high rate charge and discharge capabilities of the nickel-cadmium battery and generally has given rise to the limited-electrolyte sealed cell.

The plaques themselves are conventionally fabricated into a porous nickel sponge-like material by sintering together minute particles of nickel on a nickel substrate at relatively high temperature in a reducing atmosphere. The finalized structure is typically 80–85% porous with a pore diameter in the range of about $10\mu$. The substrate gives the plaque dimensional stability during sintering, physical strength during handling, and conducts current into the sintered matrix. Active material deposited therein produces electrodes which can be charged and discharged at relatively high rates for many thousands of cycles during its service life.

The formed nickel plaques are then used in a cathodization process involving immersion in a boiling solution of metal nitrate. Metal sheets of nickel, cadmium, platinum or platinum plated titanium are utilized to serve as the anodes and the nickel sintered plaques are made the respective cathodes. Solution temperature, concentration of the metal nitrate solution, and current density necessarily constitute the more important variables to be adjusted for the desired process time.

In any event, the nitrate anion in the referenced metal nitrate solution is reduced electrochemically, thereby causing a zone of high pH at the plaque-solution interface, thereby precipitating the heavy metal nitrate salt according to the following half reaction:

$$M(NO_3)_2 + 6H^+ + 6e^- \rightarrow 2NO\uparrow + 2H_2O + M(OH)_2 \qquad 1.$$

However, as should be readily appreciated, the bulk pH should remain substantially stabilized at an optimum value. For best results, it has been found that the reaction should be optimized as a bulk solution pH of about four (4).

Accordingly, to provide the desired stabilization, some prior art processes have utilized a suitable buffering agent. For example, sodium nitrite ($NaNO_2$) has been utilized in the impregnating liquor to effect a controlled and thus predictable reaction at the anode, namely:

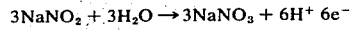
$$3NaNO_2 + 3H_2O \rightarrow 3NaNO_3 + 6H^+ + 6e^- \qquad 2.$$

When considering the overall result, the reaction is:

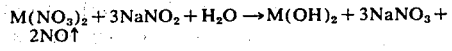
$$M(NO_3)_2 + 3NaNO_2 + H_2O \rightarrow M(OH)_2 + 3NaNO_3 + 2NO\uparrow \qquad 3.$$

Notwithstanding the fact that the addition of the referenced sodium nitrite provides the desired pH stabilization, the resultant sodium nitrate ($NaNO_3$) is a by-product of the reaction and precipitates out. Upon build up to some predetermined level, the impregnation liquor must then either be discarded or suitably purified. In either event, this necessitates a disruption of the impregnating process and results in shut down time of one sort or another.

The present invention overcomes the aforementioned deficiencies by incorporating formic acid as the buffering agent. In this way, no by-product is generated which requires eventual purification or throw away of the impregnation solution. At the same time, the inclusion of formic acid, which has a pKa of 3.75 is readily capable of buffering the impregnating solution at the optimized pH of four (4).

Formic acid, as may be readily appreciated, is easily oxidized to carbon dioxide. Accordingly, the half reaction for the oxidation of the formic acid is:

$$3HCOOH \rightarrow 3CO_2\uparrow + 6H^+ + 6e^- \qquad 4.$$

making the overall reaction for the impregnation:

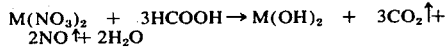
$$M(NO_3)_2 + 3HCOOH \rightarrow M(OH)_2 + 3CO_2\uparrow + 2NO\uparrow + 2H_2O \qquad 5.$$

As indicated, this means that there are no particulate by-products generated, and the carbon dioxide and nitrogen oxide are evolved as gases and thus rapidly expelled from the acetic solution without further action being necessary.

There is still another advantage in the use of formic acid in the impregnation process here under consideration. That is, it permits a corrosion step to be introduced without further action or other effort required and is important for obtaining optimum loading of the active material into the nickel plaque structure. In addition, it effects an automatic adjustment of the pH to the optimum value of four (4).

When the sintered nickel plaque is immersed in the nickel nitrate impregnation solution, the formic acid is added which then lowers the pH to approximately one (1). The thin metal oxide layer, usually present on the sintered metal plaque, is effectively eliminated by the action of the acid. Simultaneously, the pH rises and stabilizes at the optimized value of four (4). This eliminates any precleaning requirement of the sintered plaque and the optimum pH is obtained without further testing and/or adjustment. Accordingly, after an appropriate time period for the corrosion step to complete, say, thirty minutes, the electrochemical conversion of the metal nitrate to the hydroxide active material is effected by simply supplying the appropriate electric current for the cathodization process to take place.

It is to be understood that the aforedescribed process pertains primarily to the manufacture of positive nickel electrodes. However, the same can be used as well for the fabrication of the negative cadmium electrodes as well.

Accordingly, what is claimed is:

1. A process for introducing a metal hydroxide selected from the group consisting of nickel hydroxide and cadmium hydroxide into a porous electrically conductive structure which may have a thin oxidized surface layer, comprising the steps of:
   immersing the porous conductive material into a boiling solution of metal nitrate selected from the group consisting of nickel nitrate and cadmium nitrate electrolyte solution;
   adding formic acid to said electrolyte solution in a concentration to reach a pH of approximately one (1) and thereafter permitting the formic acid to react with the oxide layer of said porous conductive structure until said electrolyte solution reaches a pH of approximately four (4); and
   electrolyzing, with said porous conductive material as the cathode, the resultant electrolyte solution for a sufficient length of time to electrochemically convert said metal nitrate into metal hydroxide and impregnate said porous conductive material.

2. The process in accordance with claim 1 wherein any homolog of formic acid is used.

3. The process in accordance with claim 1 wherein said porous conductive material is in the form of a sintered nickel plaque.

4. An alkaline nickel-cadmium battery cell containing a positive electrode produced by the method of claim 1.

5. An alkaline nickel-cadmium battery cell containing a negative electrode produced by the method of claim 1.

6. The process in accordance with claim 3 wherein said sintered nickel plaque may be used to form positive battery electrodes and wherein said electrolyte solution comprises a ncikel nitrate solution.

7. The process in accordance with claim 3 wherein said sintered nickel plaque may be used to form negative battery electrodes and wherein said electrolyte solution comprises a cadmium nitrate solution.

* * * * *